United States Patent [19]

Tzakis

[11] 4,106,054

[45] Aug. 8, 1978

[54] AUTOMATIC CHROMA LEVEL SYSTEM

[75] Inventor: George J. Tzakis, Chicago, Ill.

[73] Assignee: Zenith Radio Corporation, Glenview, Ill.

[21] Appl. No.: 760,777

[22] Filed: Jan. 19, 1977

[51] Int. Cl.² .............................................. H04N 9/535
[52] U.S. Cl. .................................................... 358/27
[58] Field of Search ....................... 358/27, 32, 40, 74, 358/36, 4

[56] References Cited

U.S. PATENT DOCUMENTS

| 2,845,573 | 7/1958 | Macovski ............................... 358/65 |
| 3,272,915 | 9/1966 | Theriault ............................... 358/27 |
| 3,864,723 | 2/1975 | Carpenter ............................... 358/27 |

Primary Examiner—John C. Martin
Attorney, Agent, or Firm—Nicholas A. Camasto

[57] ABSTRACT

A color television receiver chrominance channel has first and second chrominance amplifiers supplying chrominance demodulators. An automatic chrominance control (ACC) is operative upon the first chrominance amplifier to maintain a substantially constant signal level. An automatic chrominance level control including a symmetrical amplitude limiter having a nonlinear gain characteristic for chrominance signals above a predetermined amplitude threshold is interposed between the first and second chrominance amplifiers.

8 Claims, 4 Drawing Figures

AUTOMATIC CHROMA LEVEL SYSTEM

BACKGROUND OF THE INVENTION

This invention relates generally to color television receiver chrominance channels. It is more particularly related to automatic color level systems for use within such chrominance channels.

The color television broadcast signal contains components of luminance, sound, deflection synchronization, and chrominance. The chrominance components include side bands resulting from suppressed carrier modulation of a 3.58MHz chrominance sub-carrier and a reference burst. The color saturation information is represented by the amplitude of the side bands while hue information is conveyed by their resultant phase angle relative to color burst. The burst signal comprises a short duration (typically 8 to 10 cycles) sample of the suppressed chrominance carrier used in signal modulation and provides a phase and amplitude reference for chrominance demodulation and gain control.

Color television chrominance channels vary greatly in system implementation. However, all may be generally said to include a plurality of precise bandwidth amplifiers which increase the strength of the chrominance signal to a level sufficient to permit synchronous demodulation. Generally the first chrominance amplifier is provided with an automatic chroma control (ACC) which usually includes an automatic gain control loop, operative on the first chrominance amplifier, which maintains a substantially constant chrominance signal output level. In addition it is common practice to include a viewer operable gain control at some point within the chrominance channel after the ACC responsive stage for viewer adjustment of color saturation. The ACC is responsive to the amplitude of color burst signal and maintains the appropriate signal gain for "correct" signal level to the extent that a predetermined amplitude relationship between color burst and the remainder of the chrominance signal is maintained.

As is well-known in the art however, transmission inconsistencies and receiver difficulties often produce variations in the amplitude relationship between the reference burst signal and the chrominance information. This malady manifests itself undesirably in the displayed image at one extreme as over saturated noisy colors and at the other extreme as a "washed out" or nearly colorless image. These problems and the inability of ACC systems to correct them have lead practitioners in the color television art to develop an additional type of color control system generally known as automatic color level (ACL) or also referred to as automatic saturation control (ASC). The primary objective of such systems is to minimize objectionable color saturation variations at some "tolerable" distortion of the overall performance of the chrominance channel.

An automatic color level system generally comprises a detector responsive to the amplitude of the chrominance information side bands (rather than color burst) which produces a control voltage used to control the gain of one or more of the chrominance amplifiers. Because the signals forming the chrominance side bands are varied in amplitude and resulting phase, as a function of transmitted scene content, meaningful detection thereof is virtually impossible in the classic sense and therefore several "compromise" detection schemes are used. Perhaps the most common type of ACL system is that which uses an average detector, that is, one responsive to the total, or long-term average, color saturation signal level of the side bands. Because such average detection systems respond to the total color information of the system they often produce undesired attenuation of many low saturation scene components or undesired oversaturation of high scene components due to the influence of total scene composition.

A somewhat different approach involves the use of a peak, rather than average, detector. Unlike the above-mentioned system, those using a peak detector respond solely to signals exceeding a predetermined threshold and limit or reduce chrominance gain whenever such threshold is exceeded. While peak responsive systems avoid several of the difficulties caused by average systems, they also produce undesired changes in the displayed image. For example, typical peak systems respond to a small area of a high saturation within an otherwise low saturation area by undesirably reducing the entire chrominance level of both high and low saturation portions of the scene. As a result, a "washed out" or "colorless" image is produced. Some improvement has been obtained by the use of ACL systems which are responsive in some measure to both peak and average detectors. While such systems are in many cases more desirable than either average or peak systems, their total performance nontheless produces an often undesirable compromise in color saturation correction and may become prohibitively high in cost.

Accordingly, it is a general object of the present invention to provide an improved automatic color level system. It is a more particular object of the present invention to provide an improved automatic color level system which provides saturation changes of each scene element independent of other scene elements.

SUMMARY OF THE INVENTION

In a color television receiver having a luminance channel for processing luminance information; a chrominance channel for processing an amplitude and phase modulated chrominance signal; and display means, including a viewing screen, for forming a picture image, the color saturation of which for any given luminance level is determined by the amplitude of said chrominance signal the improvement comprises amplitude limiting means within the chrominance channel, operative upon said chrominance signal and having a non-linear gain characteristic which decreases with increased chrominance signal amplitude thereby producing progressively smaller increases of displayed color saturation in said image in response to chrominance signal amplitude increases, said amplitude limiting means including threshold means having a pair of semiconductor junctions attenuating opposite sense excursions of the chrominance signals to provide symmetrical limiting such that the amplitude limiting means exhibits said non-linear gain characteristic only for signals having amplitudes in excess of a predetermined threshold level.

DESCRIPTION OF THE PREFERRED EMBODIMENT

Figure 1:
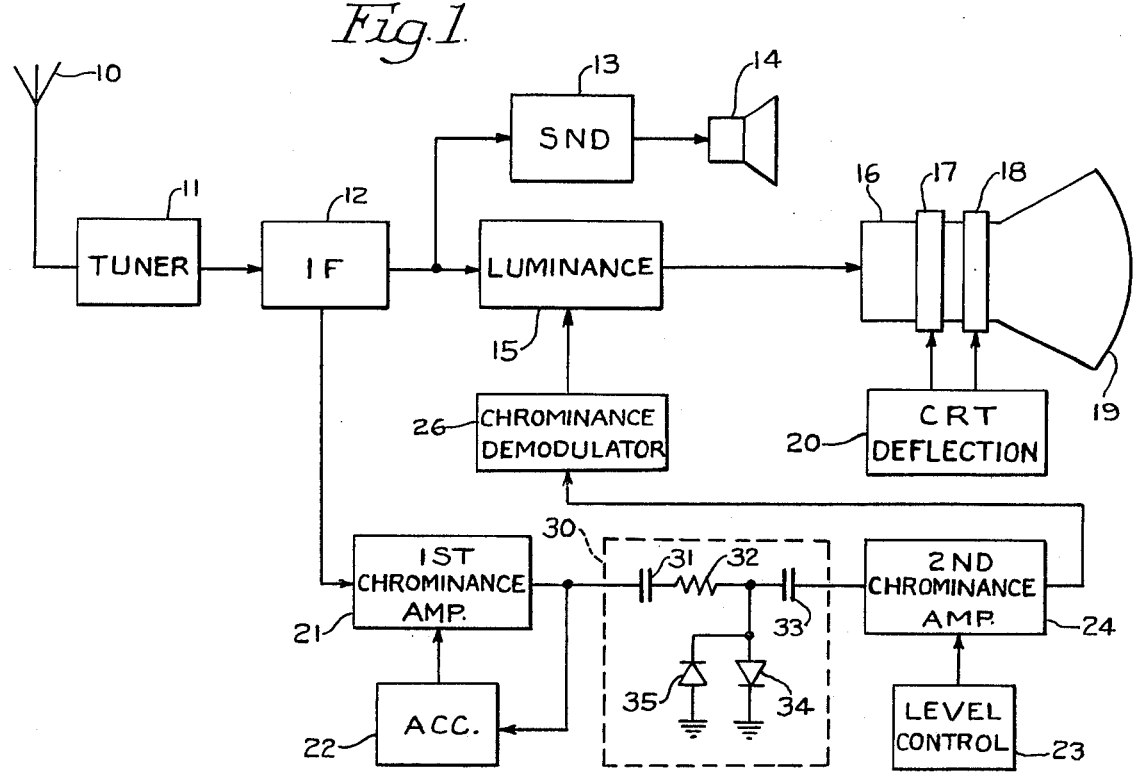
FIG. 1 shows a color television receiver constructed in accordance with the present invention utilizing an oppositely poled diode pair automatic color limiter.

FIG. 1 shows a color television receiver having an automatic color limiting system constructed in accordance with the present invention. A receiving antenna 10 is coupled to a television tuner 11. The output of tuner 11 is connected to an intermediate amplifier 12, the output of which is coupled to a luminance processor 15 and a sound processor 13. The output of the former is coupled to control electrodes (not shown) within a CRT display device 16 while the output of the latter is coupled to a speaker 14. A second output signal from IF amplifier 12 is coupled to a first chrominance amplifier 21, the output of which is coupled via the series combination of a capacitor 31, a resistor 32 and a capacitor 33 to a second chrominance amplifier 24. A pair of oppositely poled diodes 34 and 35 are coupled in shunt between the junction of capacitor 33 and resistor 32 and ground. An automatic color control (ACC) 22 is coupled to the output of first chrominance amplifier 21 and to a gain control input within amplifier 21. A viewer adjustable color level control 23 is coupled to second chrominance amplifier 24. The output of second chrominance amplifier 24 is coupled to a chrominance demodulator system 26 which in turn is coupled to luminance amplifier 15. A CRT deflection system 20 produces a pair of scansion signals which are applied to a vertical deflection yoke 17 and a horizontal deflection yoke 18 to provide appropriate scansion of a viewing screen 19 of CRT 16.

In operation, a received broadcast signal bearing modulated information components of luminance, sound, deflection synchronization and chrominance is incident upon antenna 10 producing a signal which drives tuner 11. By the familiar heterodyning process, tuner 11 converts the received radio frequency signal to an intermediate frequency signal. This intermediate frequency signal is amplified through precise bandwidth amplifiers within IF amplifier 12 to a power level sufficient to drive sound processor 13 and luminance processor 15. Sound processor 15 includes well-known frequency detection circuitry for recovering the audio information portion of the intermediate frequency signal and driving speaker 14. Similarly, luminance processor 15 includes well-known luminance signal demodulation circuitry for recovering the amplitude modulated luminance component from the intermediate frequency signal.

A frequency selective circuit (not shown) within IF amplifier 12 separates the chrominance side band and burst information from the remainder of the intermediate frequency signal for application to the first chrominance amplifier 21. ACC 22 performs the familiar automatic chroma control function in which the amplitude of the reference burst signal present at the output of first chrominance amplifier 21 is detected to produce a gain control voltage which is then applied to gain control circuitry within first chrominance amplifier 21 to perform a gain control action and maintain a substantially constant burst signal output.

The chrominance information applied to automatic color level control 30 is in the form of symmetrical side bands. In a manner described below in greater detail, automatic color level control 30 imparts a non-linear amplitude characteristic to the chrominance side bands. The non-linear processed chrominance signal is then applied to second chrominance amplifier 24, the output signal level of which is controlled by a viewer adjustable level control 23 facilitating viewer adjustment of displayed image color saturation. Chrominance demodulator 26 includes a pair of synchronous chrominance demodulators as well as a local source of 3.58MHz chrominance carrier maintained in phase synchronization with the reference burst signal. The synchronous demodulators convert the side band information to a pair of color difference signals which are then combined in suitable proportion to produce an additional color difference signal. The three color difference signals are each combined with the luminance signal within luminance processor 15 to produce a trio of CRT drive voltages. With the exception of automatic color limiter 30 the receiver set forth in FIG. 1 is entirely conventional and any of the block units therein may be constructed of well-known circuitry.

Turning now to a more detailed discussion of the performance of automatic color limiter 30, the chrominance information applied to capacitor 31 and resistor 32 is in the form of symmetrical alternate polarity sine wave voltage excursions. Capacitor 31 removes the DC component of the coupled signal which causes the alternate chrominance signal excursions to be symmetrical about ground potential. During positive polarity chrominance signal excursions diode 34 conducts when the amplitude exceeds the forward bias of the diode, thus dividing the signal between resistor 32 and conducting diode 34. Similarly, negative signal excursions cause diode 35 to conduct once the forward conduction bias is exceeded which again divides the signal between resistor 32 and the conducting diode (diode 35 in this case). Because the diodes require substantially the same magnitude of forward conduction bias, a threshold of attenuation symmetrical about ground potential results. Chrominance signals having amplitudes below the conduction bias of diodes 34 and 35 are not attenuated while those above the threshold are.

The type of attenuation, or "gain" characteristic resulting is determined by the type of diodes selected, amplitude of signal applied, and magnitude of resistor 32. In the embodiment shown, diodes 34 and 35 are selected from the well-known germanium diode family because their low forward conduction threshold bias characteristic is most appropriate for the amplitude of signal produced by first chrominance amplifier 21. In addition, germanium diodes exhibit a "soft knee" forward conduction characteristic. This means essentially that the transition from non-conduction to conduction is not severe or abrupt but rather more gradual than other "sharper" diodes. Also, the resistance of resistor 32 is selected to further "soften" the diode knee characteristics resulting in transfer characteristic 61 shown in FIG. 3. Comparison of transfer characteristic 61 and the linear transfer characteristic 60 (typical of chrominance channels without ACL) indicates that chrominance signals having an amplitude below the diode threshold voltage 63 corresponding to input level $V_1$ are transferred in a substantially linear manner as an output voltage $V_1'$. For input signals in excess of $V_1$, the transfer characteristic of ACL 30 indicated by curved line 61 departs from that of a linear system (straight line 60) and non-linear amplitude processing results. For example, an input signal $V_2$ approximately twice that of input signal $V_1$ produces a corresponding output signal $V_2'$ which is substantially less than twice that of $V_1'$. Similarly, a still higher amplitude input signal $V_3$ approximately three times $V_1$ produces a still smaller incremental increase in output signal $V_3$ which rather than being three times $V_1'$ (as would be the case in a linear system) is less than twice $V_1'$.

At this point it is important to bear in mind that the amplitude of chrominance signal applied to second chrominance amplifier 24 determines the saturation of the resulting displayed image. Accordingly, the non-linear transfer or gain of ACL 30 acts to reduce the degree of oversaturation which may occur in the displayed image while still maintaining low saturation colors. While threshold 63 may be arbitrarily fixed at any level by appropriate selection of diodes 34 and 35, resistor 32 and input signal level, it has been found optimum to select such combination to produce a threshold slightly below the amplitude level which corresponds to normally saturated flesh tone picture elements within the displayed image. Under these conditions, a small attenuation in flesh tone saturation is produced by ACL 30. However, more importantly, higher saturation scene components which frequently are displayed at objectionably high saturation levels are attenuated by ACL 30's non-linear gain characteristic.

As mentioned, diodes 34 and 35 are selected from the germanium types because of their soft knees characteristic. A somewhat different transfer or gain characteristic results if some resistance is placed in series with diodes 34 and 35. Such a characteristic is shown by graph line 62 in FIG. 3. The threshold may change with the sharp knee silicon diodes. The greater forward bias required to cause conduction (i.e. greater signal amplitude) results in a higher threshold 64. Also silicon diodes have a generally sharper or more abrupt conduction characteristic. As with curve 61 the transfer characteristic coincides with linear characteristic 60 until the forward conduction threshold is exceeded. Once threshold 64 is exceeded the slope of line 62 (i.e. gain of the ACL) is determined by the magnitudes of resistor (not shown) 32 and the resistance in series with diodes 34 and 35. The general performance of a silicon diode system is very similar to one using germanium diodes with the primary difference being a higher threshold of activity. If this is undesirable in a particular application, a proportionate reduction of input signal will, of course, lower threshold 64 to coincide with 63.

Figure 2:
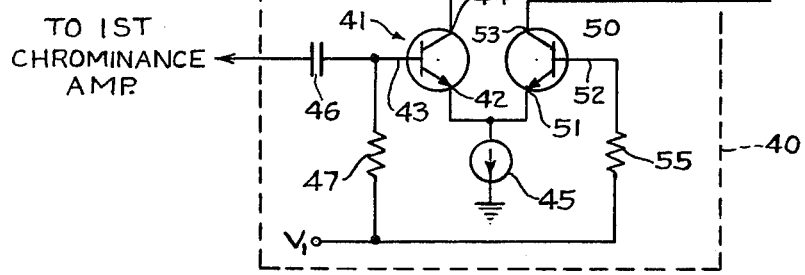
FIG. 2 is a schematic detail of an alternate embodiment automatic color limiter constructed in accordance with the present invention.

FIG. 2 shows an alternate embodiment of the present invention ACL circuit which uses a differential amplifier formed by a pair of NPN transistors 41 and 50. Transistor 41 has an emitter electrode 42, a base electrode 43 coupled to a source of positive voltage $V_1$ by a resistor 47 and to first chrominance amplifier 21 by a capacitor 46, and a collector electrode 44 connected to a source of operating voltage $+V$. Transistor 50 has an emitter electrode 51 connected to emitter 42, a base electrode 52 connected to voltage $V_1$ by a resistor 55, and a collector electrode 53 connected to the input of second chrominance amplifier 24. A current source 45 which is of well-known construction couples emitters 42 and 51 to ground.

Figure 4:
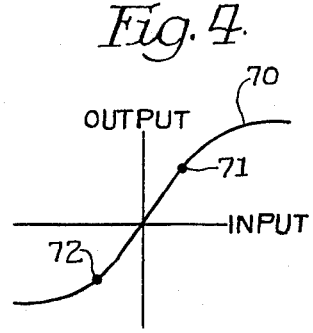
FIG. 4 is a gain characteristic graph for the differential amplifier of FIG. 2.
Figure 3:
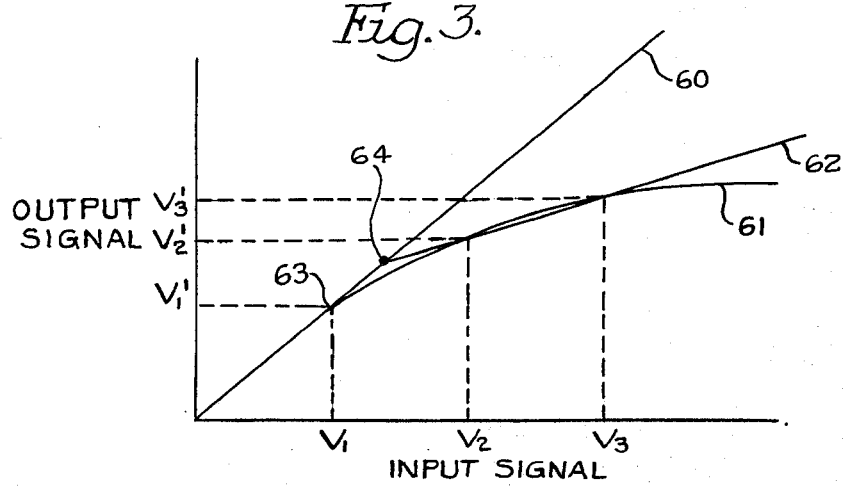
FIG. 3 is a group of gain characteristic plots.

The transfer characteristic of the differential amplifier ACL circuit 40 is substantially the same as curve 61 in FIG. 3. However, the embodiment shown in FIG. 2 performs symmetrical amplitude limiting by novel use of the "s" gain characteristic inherent in such differential amplifiers and shown in the plot 70 of FIG. 4. The characteristic includes a substantially linear region between points 71 and 72 on gain curve 70 and non-linear regions beyond 71 and 72. As mentioned, the transfer characteristic shown is inherent in a semiconductor differential amplifier configuration of the type shown in FIG. 2 and is independent of the amplitude of signal applied and the gain parameters within the differential amplifier. As a result, linear operation of such differential amplifiers is achieved by selecting the signal level such that the maximum anticipated signal excursions do not exceed the linear input characteristic region bounded by 71 and 72. Under such input conditions, the gain of the differential amplifier is determined as a function of the collector load coupled to collector 53 and the conduction level of current source 45.

In order to achieve the novel automatic color limiting of the present invention, the output of first chrominance amplifier 21 is maintained at a level in excess of the normal linear input. While a wide range of input signal amplitudes may be used, it has been found advantageous to select an input signal amplitude such that the threshold corresponds to a saturation level slightly below that of fleshtone image components. When so defined, the differential amplifier 40 functions to impart substantially the same symmetrical non-linear gain characteristic as that produced by ACL 30 using germanium diodes.

With this understanding of the present invention ACL circuit several advantages may be noted. Because no feed-back loop is employed, each scene element is processed individually in a manner totally independent of surrounding scene content, thus avoiding the majority of the above-outlined difficulties arising in peak or average feed-back systems. Also because no control voltage producing detector is used, the system response to noise within the chrominance channel is improved. The high amplitude short duration noise signals which frequently "fool" detectors in prior art systems are simply attenuated by the present invention system and appear in the displayed image as less annoying lower amplitude replicas of the original noise. Finally, the additional components and complexity of the present invention system are, in comparison with prior art feed-back systems, minimal which leads to considerable advantages in economics and ease of manufacture.

What has been shown is a novel low cost automatic color level system which does not require the use of any gain control feed-back loop circuitry or average or peak chrominance detectors, and is responsive solely to the instantaneously applied signal, thus processing each scene element independently of other scene elements.

What is claimed is:

1. In a color television receiver having a luminance channel for processing luminance information; a chrominance channel for processing an amplitude and phase modulated chrominance signal; and display means, including a viewing screen, for forming a picture image the color saturation of which for any given luminance level is determined by the amplitude of said chrominance signal; the improvement comprising:

amplitude limiting means within said chrominance channel, operative upon said chrominance signal and having a non-linear gain characteristic which decreases with increased chrominance signal amplitude and producing progressively smaller increases in color saturation of said image in response to corresponding chrominance signal amplitude increases, said amplitude limiting means including:

threshold means having a pair of semiconductor junctions attenuating opposite sense excursions of said chrominance signals to provide symmetrical limiting thereof and causing said amplitude limiting means to exhibit said non-linear gain characteristic solely for chrominance signals having amplitudes in excess of a predetermined threshold level.

2. The improvement defined in claim 1, wherein said semiconductor junctions are oppositely poled germanium rectifiers each having a forward conduction characteristic defining a predetermined "knee".

3. The improvement set forth in claim 2, wherein said amplitude limiting means maintain the chrominance signal amplitude at a level such that said threshold corresponds to chrominance signal components of lower saturation than fleshtone image elements.

4. The improvement set forth in claim 2, wherein said amplitude limiting means include means causing said knee to correspond to chrominance signal amplitudes less than fleshtone image elements.

5. The improvement set forth in claim 4, wherein said rectifiers are in shunt with said chrominance channel and wherein said threshold means further include a series resistor coupling said chrominance signal to said rectifiers.

6. The improvement defined in claim 1, wherein said amplitude limiting means is in the form of a differential amplifier; and means maintaining said chrominance signal amplitude at a level such that said threshold corresponds to chrominance signal components of lower saturation than fleshtone image elements.

7. For use in a color television receiver, a chrominance channel for processing a chrominance signal having information components of color saturation and hue together with a reference color burst signal comprising:

a first chrominance amplifier;

an automatic color control responsive to said color burst signal for maintaining the burst signal output of said first chrominance amplifier substantially constant;

a second chrominance amplifier including a viewer adjustable gain control; and amplitude limiting means including a pair of oppositely poled rectifiers coupled in shunt with said output of said first chrominance amplifier, interposed between said first and second chrominance amplifiers, having a first gain characteristic for chrominance signals having amplitudes below a predetermined threshold and a second lower gain characteristic for chrominance signals having amplitudes in excess of said threshold.

8. A chrominance channel as set forth in claim 7, wherein said amplitude limiting means include:

a differential amplifier stage having a predetermined non-linear gain characteristic.

* * * * *